US005519979A

United States Patent [19]

Kunert et al.

[11] Patent Number: 5,519,979
[45] Date of Patent: *May 28, 1996

[54] METHOD OF CENTERING WINDSHIELD GLAZINGS

[75] Inventors: Heinz Kunert, Cologne; Gerd Cornils, Merzenich-Girbelsrath; Heinrich Schnitter, Simmerath, all of Germany

[73] Assignee: Saint Gobain Vitrage, Aubervilliers Cedex, France

[*] Notice: The portion of the term of this patent subsequent to Sep. 20, 2011, has been dislcaimed.

[21] Appl. No.: 309,307

[22] Filed: Sep. 20, 1994

Related U.S. Application Data

[63] Continuation of Ser. No. 450,345, Dec. 13, 1989, Pat. No. 5,384,995, which is a continuation-in-part of Ser. No. 242,387, Sep. 9, 1988, Pat. No. 4,938,521, Ser. No. 360,654, Jun. 2, 1989, Pat. No. 4,933,032, and Ser. No. 436,280, Nov. 14, 1989, Pat. No. 5,057,265.

[30] Foreign Application Priority Data

Sep. 12, 1989 [DE] Germany ............... 39 30 414.0

[51] Int. Cl.⁶ ............... B60R 11/00; B60J 1/00; E06B 3/54
[52] U.S. Cl. ............... 52/745.15; 52/745.2; 52/204.591; 52/204.62; 52/204.69; 52/208; 296/93; 296/146.15; 296/201
[58] Field of Search ............... 52/745.15, 745.16, 52/745.2, 208, 204.591, 204.62, 204.69; 296/93, 146.15, 201

[56] References Cited

U.S. PATENT DOCUMENTS

| | | | |
|---|---|---|---|
| 1,429,223 | 9/1922 | Bruening | 296/93 |
| 1,763,603 | 6/1930 | Donahue | 296/93 |
| 2,606,635 | 8/1952 | Clingman | 296/93 X |

(List continued on next page.)

FOREIGN PATENT DOCUMENTS

| | | |
|---|---|---|
| 0024501 | 3/1981 | European Pat. Off. . |
| 122636 | 4/1983 | European Pat. Off. . |
| 0121480 | 10/1984 | European Pat. Off. . |
| 148797 | 7/1985 | European Pat. Off. . |
| 306070 | 3/1989 | European Pat. Off. . |
| 0310262 | 4/1989 | European Pat. Off. ............... 296/93 |
| 319262 | 6/1989 | European Pat. Off. . |
| 298788 | 11/1989 | European Pat. Off. . |
| 345134 | 12/1989 | European Pat. Off. . |
| 22131 | 1/1991 | European Pat. Off. . |
| 1135684 | 5/1957 | France . |
| 2266669 | 10/1975 | France . |
| 3730345.7 | 9/1987 | France . |
| 8202672 | 6/1982 | Germany . |
| 3323006 | 10/1985 | Germany . |
| 3447271 | 6/1986 | Germany . |
| 3536806 | 4/1987 | Germany . |
| 3627536 | 2/1988 | Germany . |
| 57-58509 | 4/1982 | Japan . |
| 161218 | 8/1985 | Japan . |
| 62-163818 | 7/1987 | Japan . |
| 192608 | 8/1988 | Japan . |
| 1219511 | 3/1971 | United Kingdom . |
| 2143569 | 2/1985 | United Kingdom . |
| 2147244 | 5/1985 | United Kingdom . |
| 2217375 | 10/1989 | United Kingdom ............... 296/93 |

*Primary Examiner*—Robert J. Canfield
*Attorney, Agent, or Firm*—Pennie & Edmonds

[57] ABSTRACT

A motor vehicle glazing (1) prepared for installation according to the adhesive process is provided with a profiled spacer (8) produced by extrusion of an extrudable polymer directly onto glazing (1) and subsequent setting. During installation of glazing (1) in the window opening of the motor vehicle body, profiled spacer (8) acts as an intermediate member between glazing (1) and assembly adhesive extrudate (13). Profiled spacer (8) is provided along its outer periphery with a lip portion (10) projecting beyond peripheral area (3) of glazing (1). In the installed position of glazing (1), lip portion (10) rests against the window frame flange (4) running parallel to peripheral area (3) of glazing (1) and acts, upon insertion of the glazing during the setting process of assembly adhesive (13), as a support and centering element for glazing (1).

10 Claims, 3 Drawing Sheets

U.S. PATENT DOCUMENTS

| | | |
|---|---|---|
| 3,478,475 | 11/1972 | Strack . |
| 3,774,363 | 11/1973 | Kent . |
| 3,779,794 | 12/1973 | De Santis . |
| 4,151,620 | 5/1979 | Heuzonter . |
| 4,296,961 | 10/1981 | Hunt et al. . |
| 4,433,010 | 2/1984 | Pedain et al. . |
| 4,551,372 | 11/1985 | Kunert . |
| 4,571,278 | 2/1986 | Kunert . |
| 4,581,276 | 4/1986 | Kunert et al. . |
| 4,606,159 | 8/1986 | Kunert . |
| 4,628,655 | 12/1986 | Scheiderer . |
| 4,648,222 | 3/1987 | Mivata et al. . |
| 4,681,794 | 7/1987 | Kunert et al. . |
| 4,707,958 | 11/1987 | Armbruster .................................. 52/208 |
| 4,765,673 | 8/1988 | Frabotta et al. . |
| 4,775,570 | 10/1988 | Ohlenforst et al. . |
| 4,839,122 | 6/1989 | Weaver . |
| 4,879,853 | 11/1989 | Braendle et al. . |
| 4,888,072 | 12/1989 | Ohlenforst et al. . |
| 4,933,032 | 6/1990 | Kunert . |
| 4,938,521 | 7/1990 | Kunert ................................. 296/96.21 |
| 5,057,265 | 10/1991 | Kunert et al. ............................ 264/511 |
| 5,154,028 | 10/1992 | Hill et al. .................................. 52/208 |
| 5,233,805 | 8/1993 | Hirai et al. ............................ 296/93 X |
| 5,255,483 | 10/1993 | Agrawal et al. ................... 52/204.591 |
| 5,338,087 | 8/1994 | Gross et al. ................... 52/204.591 X |

METHOD OF CENTERING WINDSHIELD GLAZINGS

This is a continuation of application Ser. No. 07/450,345, filed Dec. 13, 1989, now U.S. Pat. No. 5,384,995, which is in turn a continuation-in-part of application Ser. No. 07/242,387, filed Sep. 9, 1988, now U.S. Pat. No. 4,938,521, of application Ser. No. 07/360,654, filed Jun. 2, 1989, now U.S. Pat. No. 4,933,032, and of application Ser. No. 07/436,280, filed Nov. 14, 1989, now U.S. Pat. No. 5,057,265.

FIELD OF THE INVENTION

The invention relates to a glazing provided for bonding to the attachment flange of a window frame, in particular a motor vehicle glazing, with a profiled spacer, preferably produced by extrusion of a polymer on the side of the glazing opposite the attachment flange. The profiled spacer, acts as a support and centering element upon insertion of the glazing, as well as during the setting of the assembly adhesive. The invention describes the process for the production of such a glazing as well as a process and apparatus for performing the process.

BACKGROUND OF THE INVENTION

Motor vehicle glazings are often attached today by direct bonding to the attachment flange of the window frame in the motor vehicle body. It has proven useful to prepare the glazing prior to the assembly process, by providing the glazing with an adhesive material that is produced by extrusion on the glazing, which after setting, acts as an intermediate body between the glazing and the assembly adhesive. This eliminates the requirement of cleaning and priming the glazing on the assembly line of the motor vehicle plant, necessary for the bonding of the glazing, which results in the insertion of the glazing into the body being performed more economically. This process is known, for example, from EP-O 121 401-A1.

When inserting the glazing into the window frame of the body, the glazing must be correctly positioned and then held stationary during the setting phase of the assembly adhesive. As a rule, additional assembly aids and/or support elements are required for this purpose. EP 307 317-A1 describes a motor vehicle glazing comprised of a spacer oriented perpendicular to the glazing surface and having a support surface that bears the weight component of the glazing running in the direction of the glazing plane in the installation position, and a bracket having a support element that interacts with the support surface of the spacer. The support surface and support element cooperate to properly position and set the glazing. This known solution, however, requires additional support elements in the window frame. Further, it is required that the support elements in the window frame lie at a constant distance from the outwardly visible periphery of the window frame. Otherwise, the junction between the peripheral area of the glazing and the flange of the window frame opposite the peripheral area will exhibit a varying width, which results in the requirement to cover this juncture with an additional covering profile.

One object of the invention is to configure a motor vehicle glazing comprised of an extruded profiled spacer so that the proper centering and bracing of the glazing, during the setting phase of the assembly adhesive, is guaranteed without additional support elements being required in the window frame.

SUMMARY OF THE INVENTION

The invention provides a profiled spacer which acts as a support and centering element for the glazing. The profiled spacer includes a lip portion which is oriented approximately parallel to the glazing surface and which projects beyond the peripheral or edge of the glazing. The lip portion, in the installation position of the glazing, rests against the flange of the window frame running parallel to the peripheral area of the glazing.

The profiled spacer described in the invention is dimensioned in thickness and length so that the lip portion may deform during insertion of the glazing into the window frame. The lip portion is bent from about 45 to 90 degrees relative to the original orientation of the lip portion. While the lip portion of the spacer carries the dead weight of the glazing on the one side, it simultaneously assumes the centering and sealing function for the surrounding gap between the peripheral area of the glazing and the flange of the window frame opposite the peripheral area. This results in said gap having a constant width. The covering of said gap by an additional sealing or decorative profile is therefore, no longer necessary. Hence, an extraordinarily economical solution is provided by the invention.

If the said gap remaining between the peripheral area of the glazing and the opposite flange of the window opening of the body is not covered by an additional sealing or decorative profile, the lip portion projecting beyond the peripheral area of the glazing is outwardly visible. In this case, special measures must be taken to configure the transition zone between the beginning and the end of the extruded profile spacer to obtain a continuous spacer.

BRIEF DESCRIPTION OF THE DRAWINGS

Further details and advantages of the invention are described in detail below based on the drawings, wherein.

DETAILED DESCRIPTION OF THE PREFERRED EMBODIMENTS

Figure 1:
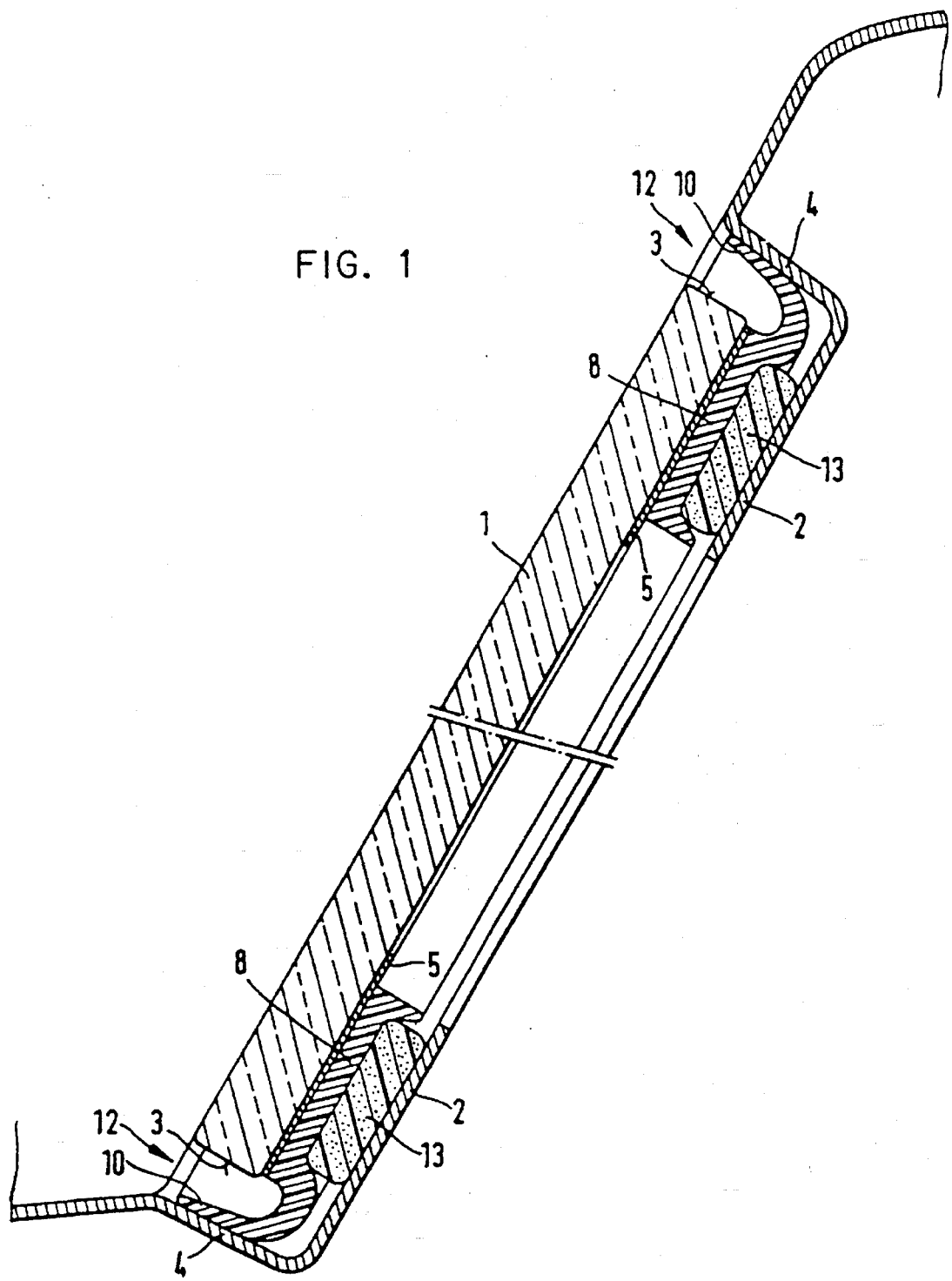
FIG. 1 discloses a motor vehicle glazing made according to the invention in the installed state, in the form of a sectional drawing.

In the case represented in FIG. 1, glazing 1 is a windshield that is inserted in the corresponding window opening of a motor vehicle body. The window opening is delineated by attachment flange 2, which runs parallel to the glazing surface, and by frame section 4 that runs parallel to peripheral area 3 of glazing 1. Glazing 1 is represented as a monolithic glazing, but said glazing may also be comprised of a multilayer laminated glazing. Along the periphery of glazing 1 there is provided, on the side facing attachment flange 2, an opaque layer 5 that consists, for example, of a baked enamel. The object of layer 5 is to prevent the adhesive compound lying behind layer 5 from being outwardly visible and simultaneously to protect the adhesive compound from UV rays.

Glazing 1 is provided on the side facing the attachment flange 2 with a profiled spacer 8, made of a polymer that is elastomeric in the set state. Profiled spacer 8 adheres to opaque layer 5. In the further description, this opaque, layer 5 is not represented for the sake of greater clarity.

Figure 2:
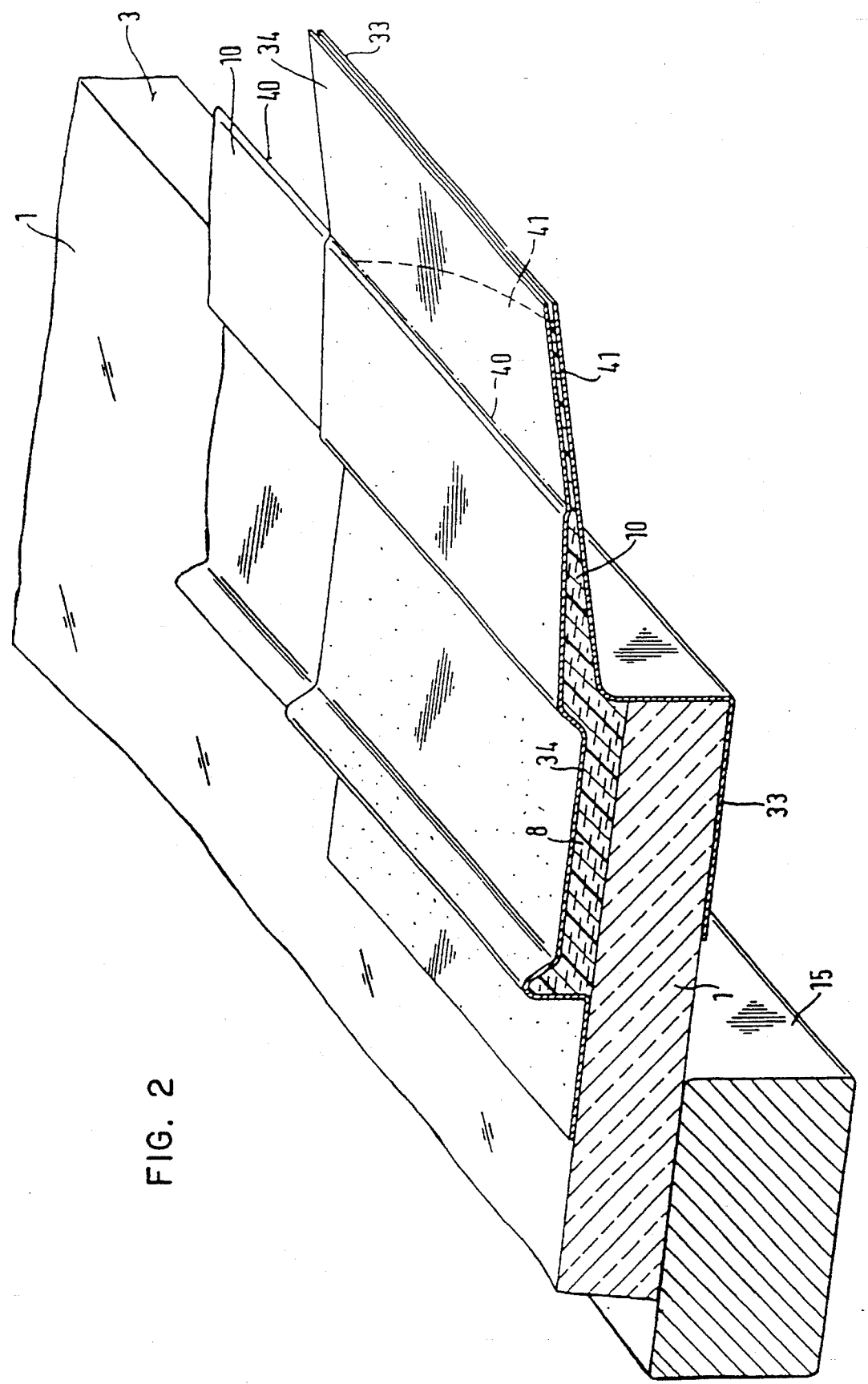
FIG. 2 discloses the position and configuration of a profile spacer according to the invention in place on the glazing prior to assembly in vehicle.

Profiled spacer 8 exhibits a continuous lip portion 10. Before installation of glazing 1 in the window frame, lip portion 10 has a straight form, as shown in FIG. 2. Lip portion 10 is oriented approximately parallel to the glazing surface and projects beyond peripheral area 3 of glazing 1 by about 5 to 10 mm. During insertion of the glazing into the window frame, lip portion 10 is bent back as shown and rests over its entire periphery against the window frame section 4 which runs parallel to peripheral area 3 of the glazing. During insertion of the glazing into the window frame, glazing 1 is automatically centered, so that a gap 12 of even width remains all around glazing 1. At the same time, lip portion 10 acts in the lower area of glazing 1 to support the glazing weight, so that no additional support measures are required during the setting process of the assembly adhesive. Finally, lip portion 10 achieves the further object of closing and sealing the gap 12.

The dimensioning of lip portion 10, i.e., in length and thickness, shall be selected so the stated objects of lip portion 10 are fulfilled in an optimal way.

The connection of glazing 1 equipped in advance with the profiled spacer 8, to the attachment flange 2 is performed with the aid of an assembly adhesive bead 13. The assembly adhesive bead 13 consists of a polymer that adheres solidly and permanently to the profiled spacer 8; for example, a moisture setting one-component polyurethane. The pressing of the glazing 1 against the attachment flange 2 required during the setting time of adhesive bead 13, is also guaranteed by the lip portion 10 of the profiled spacer 8 which, because of its high coefficient of friction and its relative stiffness, absorbs restoring forces possibly exerted by the adhesive bead 13.

The production of profiled spacer 8 is performed, with the aid of the extrusion technique generally known in the art, by extruding a suitable polymer that adheres to the glazing by bonding. As for polymers used in the production of the profiled spacer 8, one-component polyurethane prepolymers in paste form that set after extrusion, under the influence of atmospheric moisture, into high modulus elastomers are acceptable. Such polyurethane systems are described in U.S. Pat. No. 3,779,794. Polyurethane systems on a two-component basis may also be used. For example, adhesive systems as described in European patents 0 083 797 and 0 024 501. Depending on the adhesive compound used, the surface on which the admissive material is applied is to be pretreated in the required manner and as an option, provided with one or more suitable priming layers.

To produce the profiled spacer 8 on the glazing 1, a method and apparatus are described in U.S. patent application Ser. No. 436,280 filed Nov. 14, 1989 the content of which is expressly incorporated herein by reference thereto. This spacer 8 is preferably applied to the glazing 1 by a compression molding technique.

During the production of the profiled spacer, it is desirable to utilize a release film 33, 34 which adhere to the polymer material, but does not bond thereto. For this reason, after the setting of the polymer material, films 33 and 34 can easily be removed from profiled spacer 8 by simple pulling.

Films 33 and 34 consist of a material whose surface has anti-adhesive properties relative to the polymer material of the profile spacer 8. Thin films of polyester or polyethylene have proven themselves useful for this purpose. If a moisture setting system is used as polymer material for profiled spacer 8, films 33, 34 must exhibit a sufficient water vapor permeability, so the moisture necessary for the setting process can diffuse through the films. Optionally, films 33, 34 may exhibit a specific porosity or a microperforation.

Films 33, 34 confer on lip portion 10 an additional rigidity during the setting process, and a thin layer between two films 33, 34 and sets into a flash or tab 41 projecting beyond edge 40 of lip portion 10. After the setting of the polymer is finished, this flash or tab 41 is cut along edge 40 of the lip portion 10 together with films 33 and 34 and is removed. This results in a clean final edge of lip portion 10 being achieved, even in the transition zone of profile spacer 8. Remaining film pieces 33, 34 are then removed from profile spacer 8 and lip portion 10.

Figure 3:
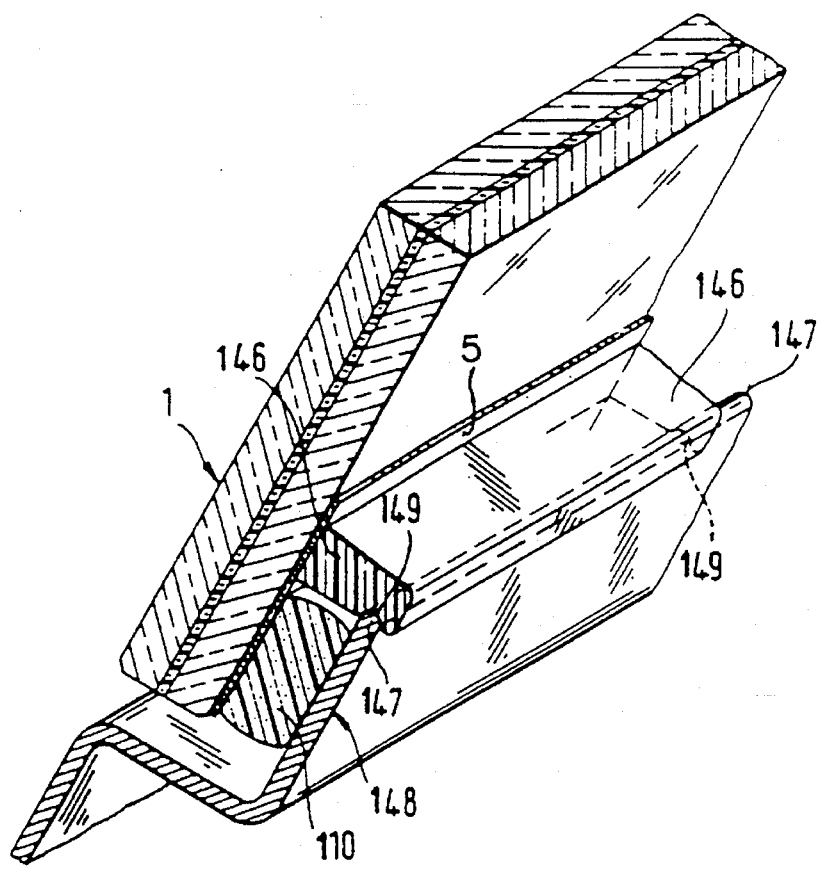
FIG. 3 discloses another spacer and bracket for the bottom of a windshield.

FIG. 3 illustrates another embodiment of a spacer 146 in the lower part of a window opening. Here the spacer 146 is placed along the lower edge of glazing 1 and serves as a rigid support bonded to the glazing. The spacer 146 will rest on the upper edge 147 of sheet metal bracket 148. Also, spacer 146 is equipped along its lower face with a groove 149 in which the upper edge 147 of sheet metal bracket 148 becomes engaged. The immobilization achieved by spacer 146 lasts at least as long as is necessary for the bead of glue 110 to set.

Figure 4:
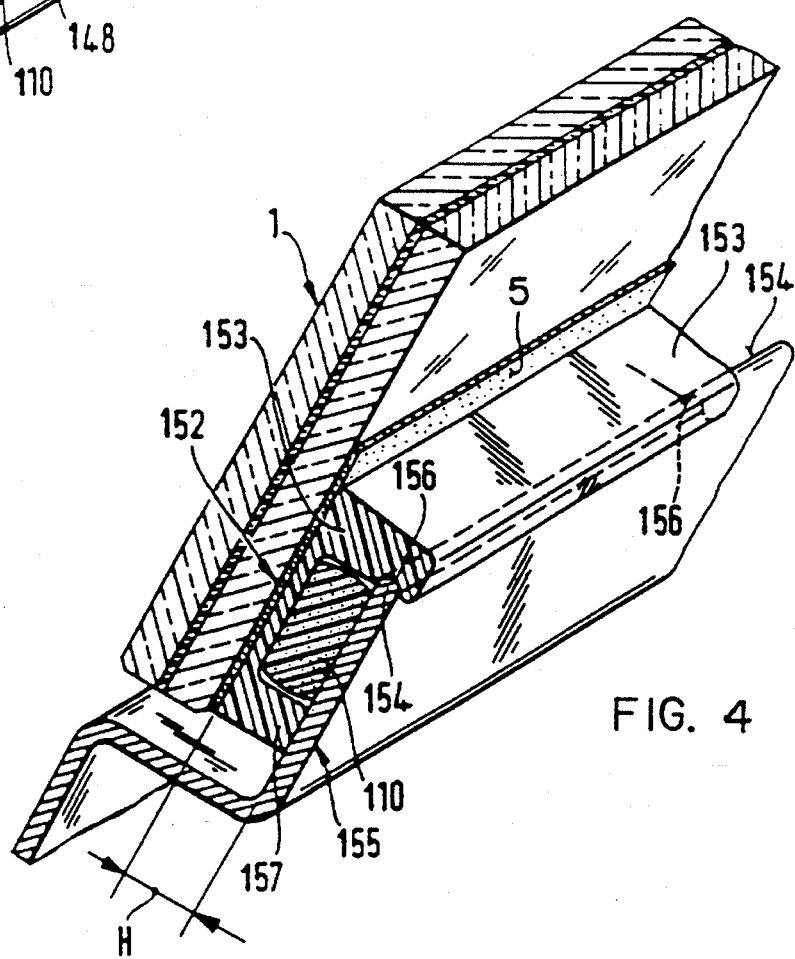
FIG. 4 discloses yet another spacer and bracket for the bottom of a windshield according to the invention.

FIG. 4 shows an embodiment in which glazing 1 is equipped with a spacer 152, which, when placed over the entire periphery, achieves a positioning in three dimensions through its interaction with the sheet metal bracket 155. The edge 154 of sheet metal bracket 155 is inserted into the groove 156 of the inner peripheral portion 153 in such a way as to achieve precise positioning of the glazing within its plane. The outer peripheral portion 157 has a height H which corresponds to the desired distance between the glazing and the sheet metal bracket 155. This peripheral portion functions as a stop during placement of the glazing into the window opening. Thus, the bead of glue 110 is pressed on by the glazing in the direction of the sheet metal bracket 155 to the limit established by the peripheral portion involved. Therefore, a precise positioning of the glazing in the direction perpendicular to its surface is also obtained.

The embodiments of the invention described relate to the windshield of a motor vehicle. But the invention can also be applied in the same manner to glazings intended for doors, side windows, end gates, sun roofs, sliding roofs, rear flaps, and headlight flaps of motor vehicles. Further, the invention can be applied in other areas wherever glazings are attached in a frame by the adhesive method. In the vehicle field, for example, it may be used successfully also for the windows of trailers and railroad cars. It can also be used equally successfully for the windows of window openings in the construction sectors as well as for the installation of glazings in appliances and furniture, for example, household refrigerators.

We claim:

1. A method of centering a substantially planar glazing upon a bracket which comprises providing substantially the entire periphery of said glazing with a spacer comprising a lip portion which extends beyond the edge of said glazing and is initially oriented essentially parallel to the plane of said glazing and placing said glazing parallel to an edge of a mounting bracket and within the bracket, whereby said lip portion of the spacer contacts said bracket to provide a force for centering said glazing thereon, which force is sufficient to maintain centering of the glazing on the bracket and to provide a gap between the glazing edge and the bracket around substantially the entire periphery of the glazing.

2. The method of claim 1 which further comprises dimensioning said lip portion in length and thickness to provide said centering force.

3. The method of claim 1 which further comprises forming said lip portion of an elastomer having a modulus of elasticity which is sufficiently high to provide said centering force.

4. The method of claim 1 which further comprises securing said glazing to said bracket with a bead of adhesive.

5. The method of claim 4 which further comprises configuring said spacer supporting said bead of adhesive.

6. The method of claim 5 which further comprises configuring the spacer to have a recessed portion to receive said adhesive bead.

7. The method of claim 6 which further comprises providing said spacer with a pair of leg portions which define the sides of said recessed portion.

8. The method of claim 4 which further comprises forming said lip portion having a modulus of elasticity and a coefficient of friction with said bracket which are sufficiently high to fix the glazing against said bracket during setting of said adhesive bead.

9. The method of claim 1 wherein the centering force is sufficient to prevent said glazing edge from contacting said bracket.

10. The method of claim 1 wherein the centering force is sufficient to provide a gap between the glazing edge and the bracket around the entire periphery of the glazing.

\* \* \* \* \*

UNITED STATES PATENT AND TRADEMARK OFFICE
CERTIFICATE OF CORRECTION

PATENT NO.    : 5,519,979

DATED         : May 28, 1996

INVENTOR(S)   : KUNERT et al.

It is certified that error appears in the above-identified patent and that said Letters Patent is hereby corrected as shown below:

On the title page of the patent, in the Notice of terminal disclaimer, "Sep. 20, 2011, has been dislcaimed" should read --June 2, 2009, has been disclaimed--.

Signed and Sealed this

Twenty-ninth Day of May, 2001

Attest:

NICHOLAS P. GODICI

*Attesting Officer*      *Acting Director of the United States Patent and Trademark Office*